United States Patent [19]

Gilbert et al.

[11] Patent Number: 5,092,821

[45] Date of Patent: Mar. 3, 1992

[54] DRIVE SYSTEM FOR IMPELLER SHAFTS

[75] Inventors: Ronald E. Gilbert, Chardon; David M. Masarin, Hinckley; George S. Mordue, Ravenna, all of Ohio

[73] Assignee: The Carborundum Company, Niagara Falls, N.Y.

[21] Appl. No.: 467,028

[22] Filed: Jan. 18, 1990

[51] Int. Cl.[5] ............................. F16D 3/20; F04B 9/02
[52] U.S. Cl. ..................................... 464/152; 403/118; 403/287; 417/359; 464/901
[58] Field of Search ................. 464/147, 150, 152, 901; 403/287, 118; 417/359, 423.1, 424.1

[56] References Cited

U.S. PATENT DOCUMENTS

| | | | |
|---|---|---|---|
| 2,017,302 | 10/1935 | Yoder | 417/359 |
| 2,598,780 | 6/1952 | Garnier | 464/147 |
| 2,858,768 | 11/1958 | Gaylord, Jr. et al. | 417/423.1 |
| 2,973,214 | 2/1961 | Bates et al. | 464/180 X |
| 3,115,096 | 12/1963 | Wall | 417/359 X |
| 3,324,798 | 6/1967 | Freed et al. | 417/359 X |
| 4,595,383 | 6/1986 | Nienhaus | 464/901 X |

Primary Examiner—Daniel P. Stodola
Assistant Examiner—William G. Battista
Attorney, Agent, or Firm—Larry W. Evans; David J. Untener; Scott A. McCollister

[57] ABSTRACT

A drive system for impeller shafts includes a coupling that has a universal joint that is lubricated under all operating conditions. A housing is connected to the universal joint, which housing includes a hollow end portion adapted to receive the non-threaded end of an impeller shaft. A threaded stud projects from the end of the shaft and into the housing where the stud is secured by means of a nut. The nut is readily accessible to the user so that the axial position of the shaft can be adjusted without difficulty. The nut is releasably held within the housing so that the shaft and stud, with nut attached, can be quickly disconnected from the coupling. The invention also includes a modified "square drive" configuration for the ends of the shaft that is extremely strong and enables the shaft to be connected to the impeller and the coupling very easily.

14 Claims, 6 Drawing Sheets

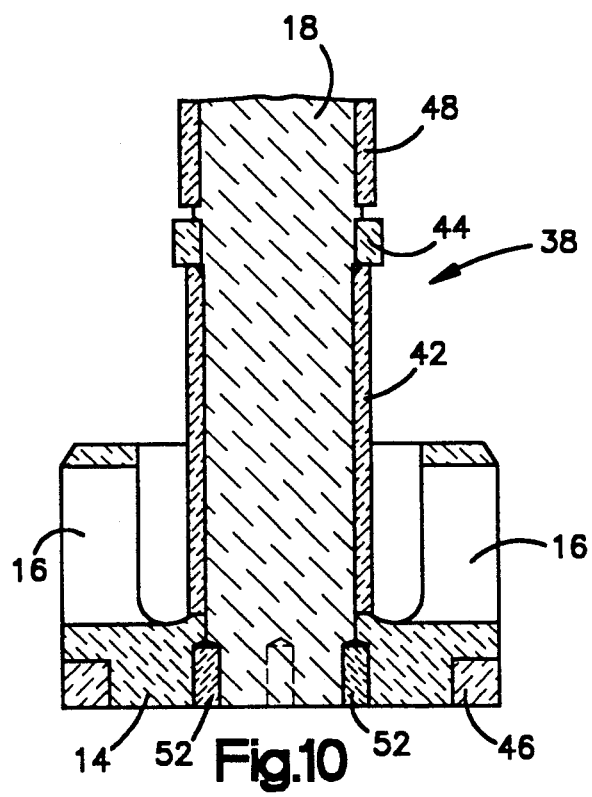
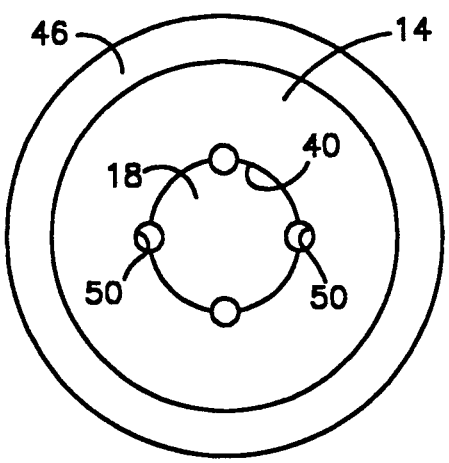
Fig.11
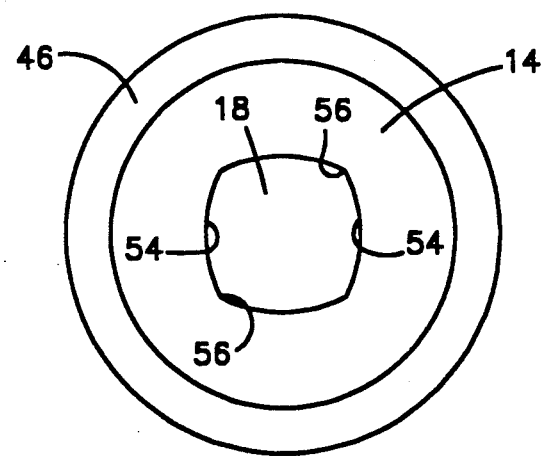
Fig.12

DRIVE SYSTEM FOR IMPELLER SHAFTS

BACKGROUND OF THE INVENTION

1. Field of the Invention

The invention relates to impeller shafts and, more particularly, to the construction of such shafts and to a drive system that (a) enables the shafts to be connected or disconnected quickly, (b) reduces the possibility that the shafts will be fractured by excessive torque or vibrational loads, and (c) enables the shafts to be axially adjusted easily.

2. Description of the Prior Art

Impeller shafts are used in a variety of applications such as molten metal pumps, mixers, dispersers, and other equipment. In particular, impeller shafts made of graphite are used in environments that are hostile to shafts made of other materials. An especially desirable use for graphite shafts is that of supporting rotatable impellers in molten metal pumps. Properly treated, graphite is an oxidation-resistant material that enables the shafts to be effective in withstanding attack by corrosive substances such as molten aluminum.

A problem with graphite shafts is that they are not very strong. Consequently, it is difficult to work with them and they must be handled carefully. Another drawback of graphite shafts relates to the technique by which they are connected to drive motors and impellers. It is conventional to connect a graphite shaft to a drive motor by threading the shaft into a coupling connected directly or indirectly to the motor. Unfortunately, a threaded shaft cannot be adjusted axially relative to the coupling because the threaded end of the shaft will be bottomed out upon connection to the coupling. The same problem occurs when an impeller is threaded onto the other end of the shaft. Additionally, after the shaft has been used, torque that has been transmitted to the shaft during use will cause the shaft to be very tightly connected to the coupling and the impeller such that the components cannot be separated easily. In extreme cases, it is necessary to destroy the shaft in order to remove the shaft from the coupling.

An additional problem related to graphite shafts is that they frequently are fractured in use due to excessive torque or vibrational loads that are applied to the shafts. In the particular instance of graphite shafts used in molten metal pumps, it sometimes happens that foreign objects are ingested into the pumps. In this circumstance, an excessive torque load may be applied to the shafts, resulting in catastrophic failure of the shafts, often in the region of the relatively weak threaded connections. Another problem is that threaded shafts can transmit torque only in the direction which tightens the threads. A shoulder must be provided to limit the advancement of the thread into the mating part. This subjects the shaft to a high tensile stress between the thread and the shoulder. Graphite tolerates much lower tensile stress than compressive stress. Failure at the thread-shoulder intersection is, by far, the most common failure location Desirably, an impeller shaft would be available that would enable the impeller to be easily connected to the shaft with minimal machining of the shaft and the impeller, and which would have superior strength characteristics. Another advantageous feature would be a drive motor-impeller shaft connection that would permit the shaft to connected and disconnected easily from the drive motor without requiring excessive handling o machining of the shaft. Additionally, it would be desirable to have a drive motor-impeller shaft connection that would be stronger than conventional threaded shaft connections, that would resist vibrational loads well, and that would permit the ready replacement of worn or broken parts. Yet additionally, it would be desirable to be able to easily adjust the shaft axially relative to the drive motor.

SUMMARY OF THE INVENTION

The present invention provides a new and improved drive system for impeller shafts that addresses the foregoing concerns. An impeller shaft according to the invention is an elongate, cylindrical member that at one end is adapted to receive an impeller or other element, such as a rotor, and is adapted at its other end to be connected to a drive motor. The shaft requires minimal machining, and it completely avoids the use of threads. The impeller-shaft connection is made by providing an opening through the center of the impeller and placing the shaft in the opening. The impeller is cemented to the end of the shaft to prevent axial separation. Relative rotational movement is prevented by forming the impeller opening and the end of the shaft in a modified "square drive" configuration that includes convex side portions connected by rounded corners. At its other end, the shaft is configured the same as the impeller end.

The drive system according to the invention includes a coupling having first and second housings and defining a longitudinal axis of rotation. The first housing is adapted to be connected directly to a drive motor and the second housing is adapted to be connected to the non-impeller end of the impeller shaft. The second housing includes a modified "square drive" opening into which the shaft can be fitted. The non-impeller end of the impeller shaft is provided with a threaded stud that projects from the end of the shaft. A threaded nut is disposed within the second housing for engagement with the stud. The nut is rotatable relative to the stud and the second housing, thereby permitting the axial position of the shaft to be adjusted easily.

The invention also includes a quick disconnect feature for the shaft. In the preferred embodiment, the adjustment nut is provided with radially extending openings into which drive pins carried by an annular sleeve will fit. The pins normally are biased into the openings by means of an axially movable knob. However, upon displacing the knob against a spring bias, the pins will be removed from the openings in the nut, thereby permitting the nut (as well as the stud and the impeller shaft) to be removed from the second housing.

The invention also includes a universal joint for reducing vibrational loads that otherwise would be applied to the shaft. The universal joint is included as part of the first housing. The universal joint in the preferred embodiment includes an input collar rigidly secured to the drive shaft of the drive motor. The input collar is concentrically disposed within the housing. Rotatable keys project outwardly from the collar and engage shoes carried by the housing. The keys and shoes include respective convex/concave surfaces that enable the housing and the shaft to be pivoted relative to each other. The lower portion of the first housing is fluid-tight so that lubricating fluid such as oil can permanently retained within the housing, thereby providing continual lubrication for the universal joint.

By use of the present invention, damage to the impeller shaft is eliminated or substantially reduced, in part because the strength of the shaft and the universal joint tend to prevent catastrophic failure of the shaft. The universal joint also is very reliable because it is permanently lubricated. The impeller and the shaft can be connected easily and quickly, and the resultant connection is very strong. The particular construction of the coupling enables the shaft to be connected and disconnected from the drive motor quickly, and to be easily adjusted axially relative to the drive motor. Moreover, the coupling is constructed such that it can be disassembled without special tools or equipment, thereby facilitating the replacement of worn or broken parts.

The foregoing and other features and advantages of the invention are illustrated in the accompanying drawings and are described in more detail in the specification and claims that follow.

BRIEF DESCRIPTION OF THE DRAWINGS

FIG. 10 is a cross-sectional view of an alternative embodiment of the impeller shaft according to the invention;

FIG. 11 is a bottom plan view of the impeller shaft of FIG. 10; and

FIG. 12 is a bottom plan view of a preferred impeller shaft according to the invention.

DESCRIPTION OF THE PREFERRED EMBODIMENT

Figure 1:
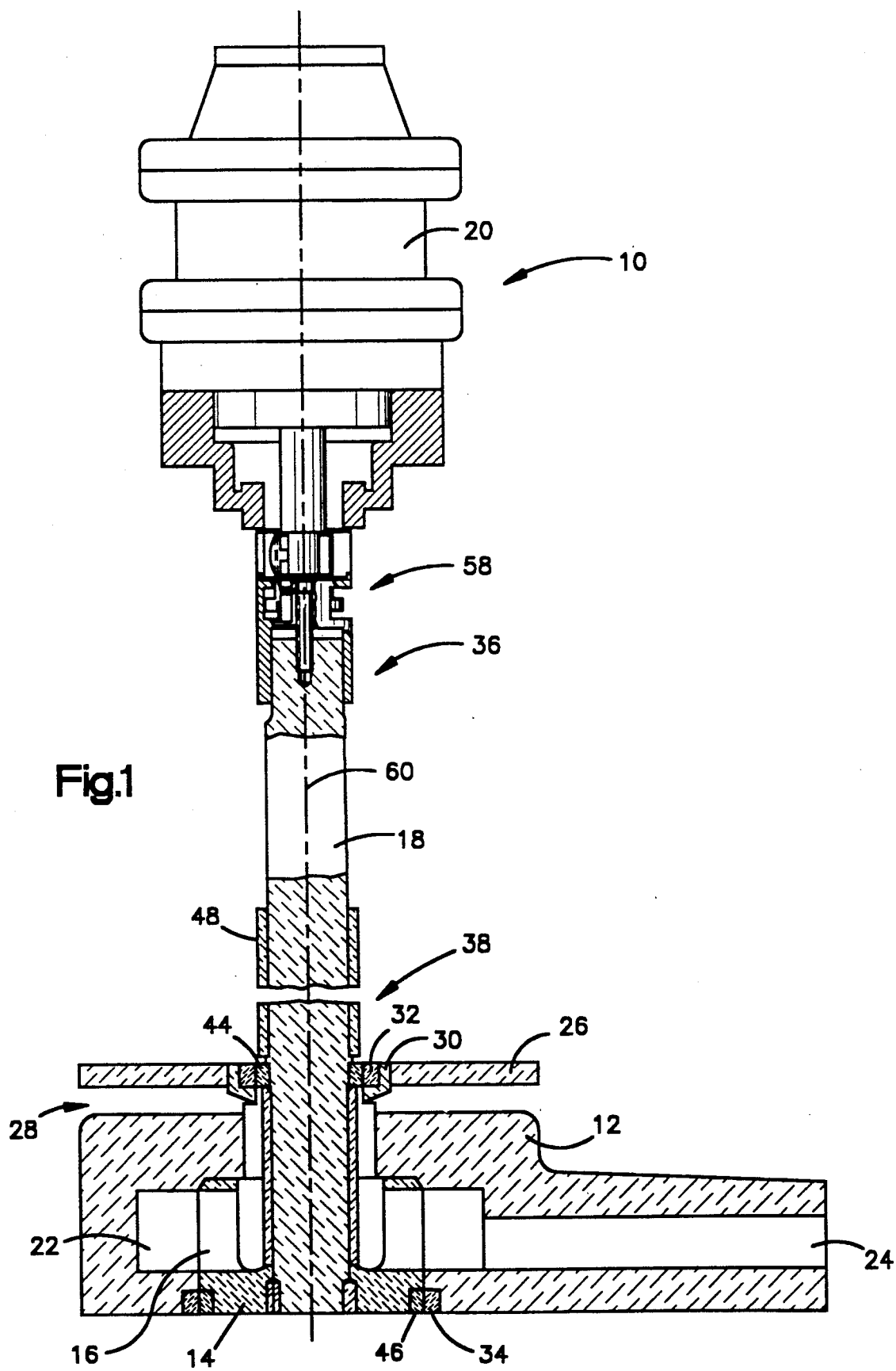
FIG. 1 is a cross-sectional view of a molten metal pump, showing an impeller shaft and a drive system according to the invention.

Referring to FIG. 1, a molten metal pump is indicated generally by the reference numeral 10. The pump 10 is adapted to be immersed in molten metal contained within a vessel (not shown). The vessel can be any container containing molten metal such as the external well of a reverberatory furnace.

It is to be understood that the pump 10 can be any type of pump suitable for pumping molten metal. Generally, however, and as particularly shown in FIG. 1, the pump 10 will have a base member 12 within which an impeller 14 is disposed. The impeller 14 includes a plurality of radially extending openings 16. The impeller 14 is supported for rotation within the base member 12 by means of an elongate, rotatable shaft 18. The upper end of the shaft 18 is connected to a motor 20. The motor 20 can be of any desired type.

The base member 12 includes a pumping chamber 22 and an outlet passageway 24 in fluid communication with the chamber 22. Because the passageway 24 is disposed beneath the upper surface of the molten metal, the pump 10 functions as a so-called circulation pump, that is, it circulates molten metal within the vessel. As indicated earlier, however, the pump 10 is described for illustrative purposes and it is to be understood that the pump 10 can be any type suitable for the pumping of molten metal.

A baffle plate 26 is connected to the upper portion of the base member 12 and is spaced therefrom a small distance in order to define a fluid inlet 28. The baffle plate 26 is supported by a shaft bearing mount 30. A bearing ring 32 of silicon carbide or other material having bearing properties at high temperature is disposed within the bearing mount 30. In like manner, a second bearing ring 34 of silicon carbide or other material having bearing properties at high temperature is disposed at the lowermost end of the base member 12 in facing relationship to the lowermost end of the impeller 14.

The shaft 18 typically is formed of graphite. It is to be understood that the present invention is especially effective with shafts made of graphite; however, the invention is usable with shafts made of other materials such as ceramic or coated metal. The use of the phrase "graphite shafts" used herein is intended to encompass all such materials, where the use of such materials would be appropriate.

The first, or upper end of the shaft 18 is indicated by the reference numeral 36. The second, or lower end of the shaft 18 is indicated by the reference numeral 38. The first end 36 is adapted to be connected to the drive motor 20, while the second end 38 is adapted to be connected to the impeller 14.

Referring particularly to FIGS. 10 and 11 which illustrate an alternative embodiment of the invention, the second end 38 is generally cylindrical, and is received within a cylindrical opening 40 formed in the impeller 14. A cylindrical sleeve 42 is disposed about the lower end 38. The upper end of the sleeve 42 engages a bearing ring 44 which is axially fixed relative to the shaft 18. A bearing ring 46 is disposed about the lower most end of the impeller 14. The bearing rings 44, 46 are made of silicon carbide or other material having bearing properties at high temperature. The bearing rings 44, 46 in use are disposed in facing relationship to the bearing rings 32, 34 respectively.

A second sleeve 48 is disposed about the shaft 18 at a vertical location above the ring 44. As is indicated in FIG. 10, the sleeve 42 not only serves to space the impeller 14 at a proper axial location relative to the shaft 18, but it also serves to maintain the axial location of the bearing ring 44 relative to the base member 12. The sleeve 42 provides mechanical support for the bearing ring 44. In use, the bearing ring 44 is subjected to various stresses. The sleeve 42 helps to reduce premature failures of the bearing ring 44.

The impeller 14, the sleeves 42, 48, and the bearing ring 46 are secured to the second end 38 by means of refractory cement such as FRAXSET, commercially available from the Metaullics Systems Division of The Carborundum Company, 31935 Aurora Road, Solon, Ohio 44139. The refractory cement prevents relative axial movement between the impeller 14 and the shaft 18. In order to prevent relative rotational movement between the impeller 14 and the shaft 18, a plurality of openings 50 are formed in the impeller 14 and the shaft 18 at the interface between the two. The openings 50 are aligned with the longitudinal axis of the shaft 18. Dowels 52 (FIG. 10) are inserted into the openings 50 and retained there by means of refractory cement. The dowels 52 thus function as keys.

As illustrated, the shaft 18 is cylindrical and the second end 38 is received within a cylindrical opening 40 by means of a non-threaded connection. It will be appreciated that the second end 38 could take other configurations such as splined, "square drive," and other non-cylindrical forms. While a cylindrical configuration offers various advantages such as the ready availability of cylindrical shafts and the simplicity and strength of the previously described shaft-impeller connection, a preferred shaft-impeller connection has been discovered.

Referring particularly to FIG. 12, the opening in the impeller 14 can be formed in a modified "square drive" configuration. In particular, the opening can include concave sidewall portions 54 having a relatively large radius, and rounded corners 56 having a relatively small radius. As illustrated in FIG. 12, four sidewall portions 54 are provided, with four corners 56 connecting the adjacent sidewall portions 54. The second end 38 is provided with matching sidewall portions and corners so as to snugly fit within the opening defined by the sidewall portions 54 and the corners 56 of the impeller 14. For a shaft 18 having a nominal outer diameter of about 4.0 inches, the second end 38 will be reduced in size to provide a maximum sidewall-to-sidewall spacing of about 3.192 inches, and a maximum corner-to-corner spacing on the diagonal of about 3.622 inches. The radius of the sidewall portions 54 will be about 2.972 inches, while the radius of the corners 56 will be about 0.375 inch.

As with the embodiment described in FIGS. 10 and 11, the modified square drive connection between the impeller 14 and the shaft 18 can be secured by means of refractory cement. Although the embodiment of the invention illustrated in FIG. 12 is slightly more difficult to machine than the embodiment illustrated in FIGS. 10 and 11, it is believed to be stronger, due in part to the rounded sidewall portions and the rounded corners.

Figure 2:
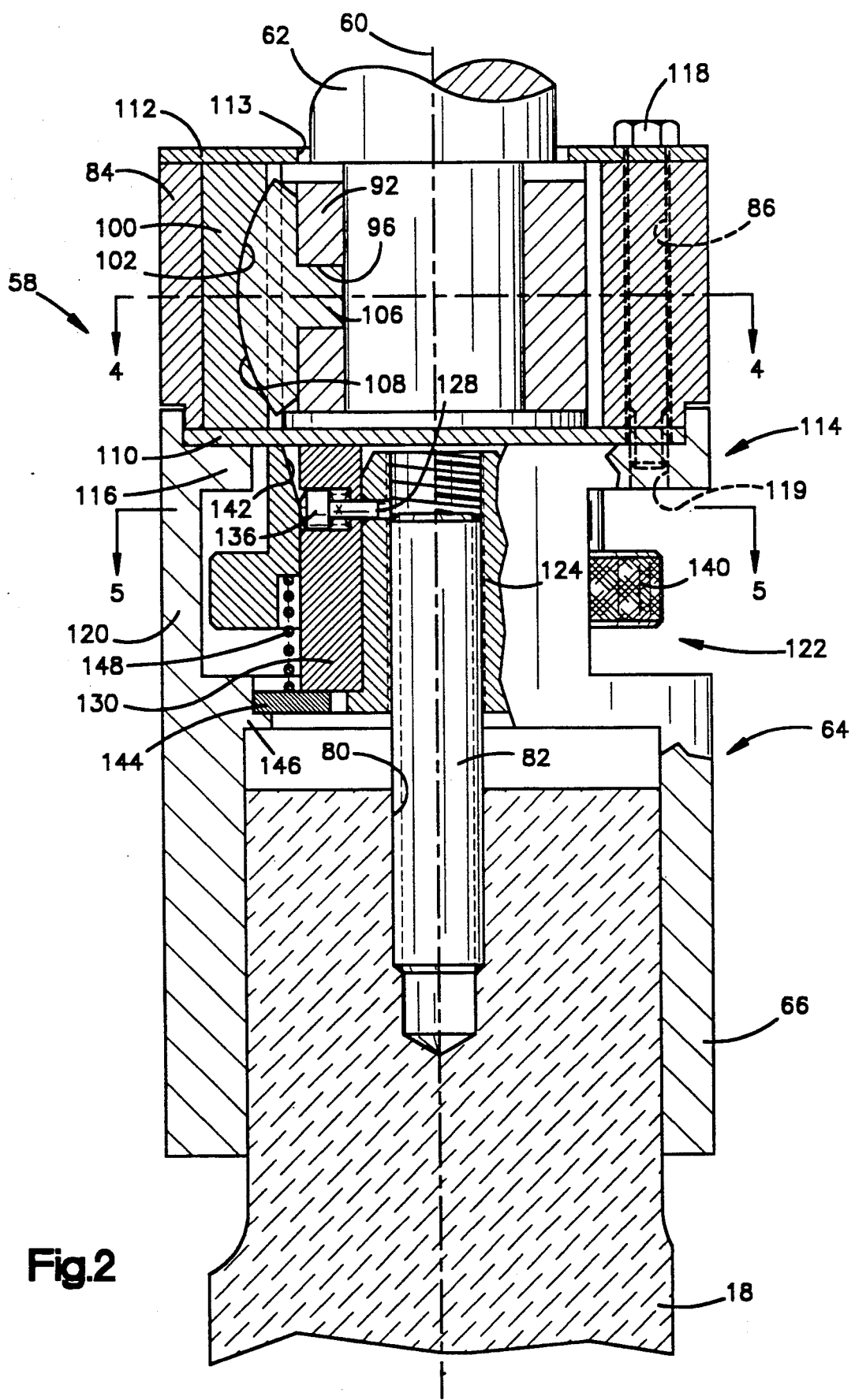
FIG. 2 is an enlarged cross-sectional view of a portion of the impeller shaft and a coupling according to the invention.
Figure 3:
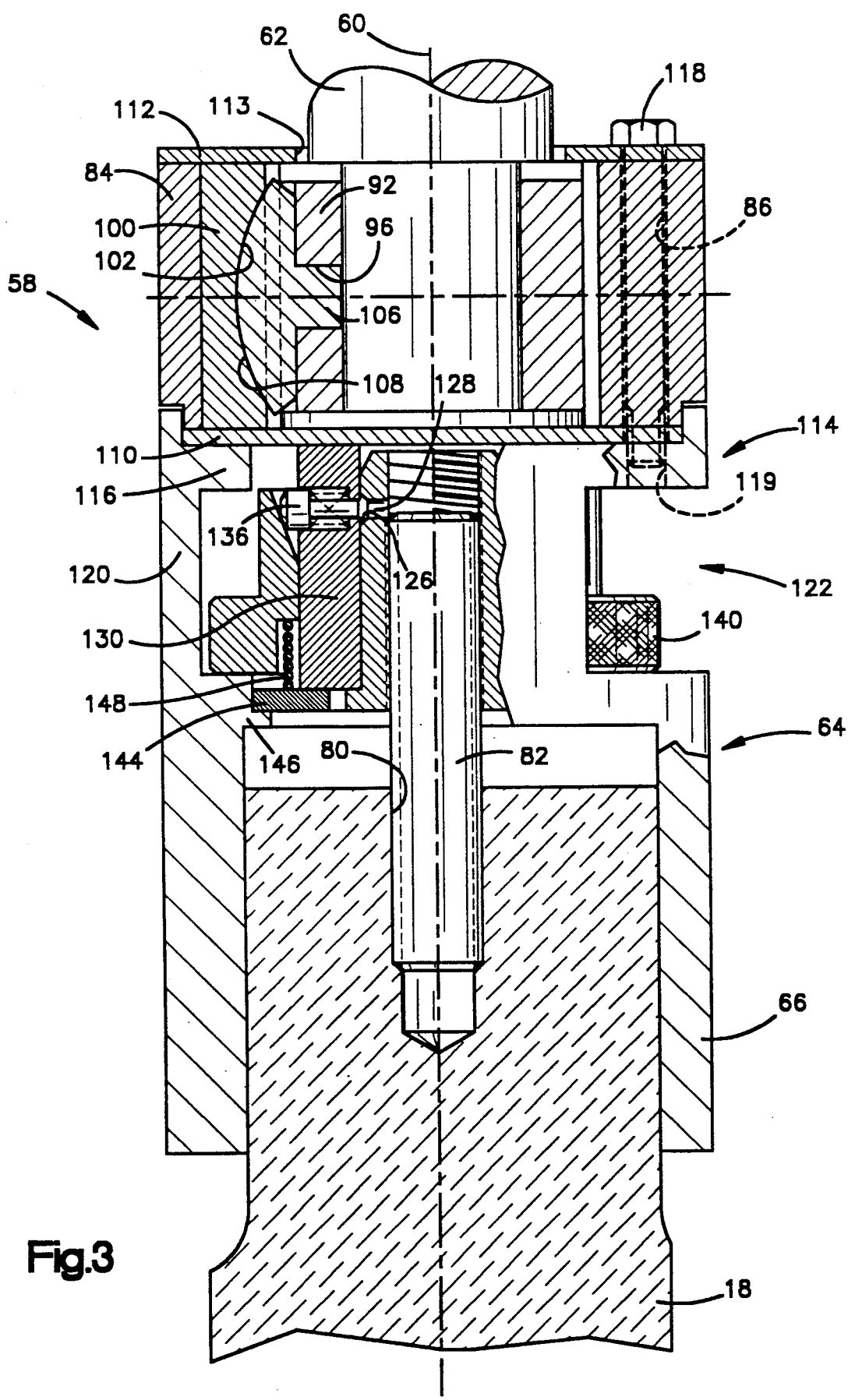
FIG. 3 is a view similar to FIG. 2, showing portions of the coupling moved to a shaft-disconnect position.

Referring particularly to FIGS. 1-3, the first end 36 is connected to a coupling 58 that defines a longitudinal axis of rotation 60. The coupling 58 is connected to a drive shaft 62 extending from the motor 20, which drive shaft 62 is rotatable about a longitudinal axis coincident with the axis 60.

Figure 6:
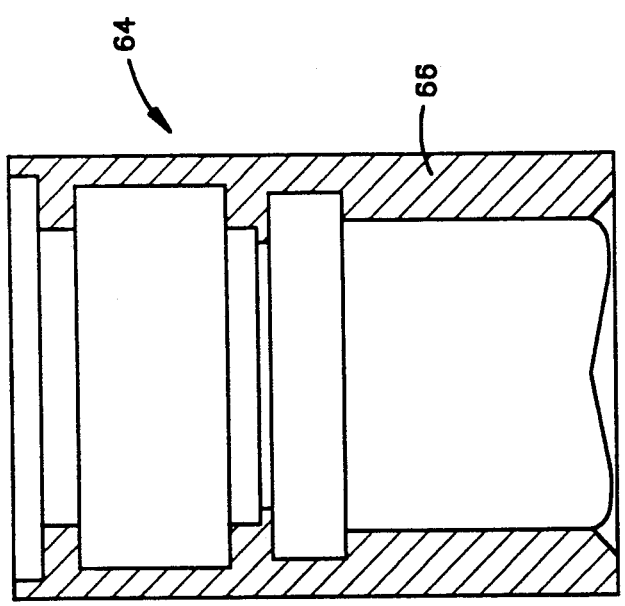
FIG. 6 is a cross-sectional view of an output housing usable with the present invention, with internal components removed for clarity of illustration.
Figure 7:
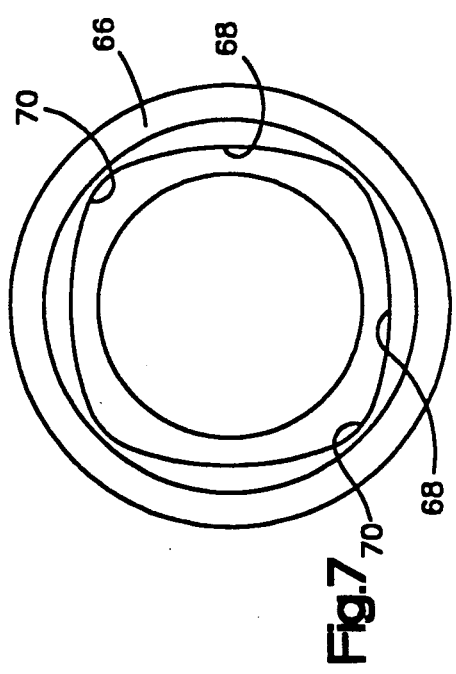
FIG. 7 is a bottom plan view of the housing of FIG. 6.

The coupling 58 includes an output housing 64. Referring particularly to FIGS. 6 and 7, the output housing 64 includes a hollow end portion 66 into which the first end 36 is fitted. In the preferred embodiment of the invention, the hollow end portion 66 is configured like the impeller shown in FIG. 12. That is, the end portion 66 includes four concave sidewall portions 68 and four rounded corners 70 that connect the sidewall portions 68.

Figure 8:
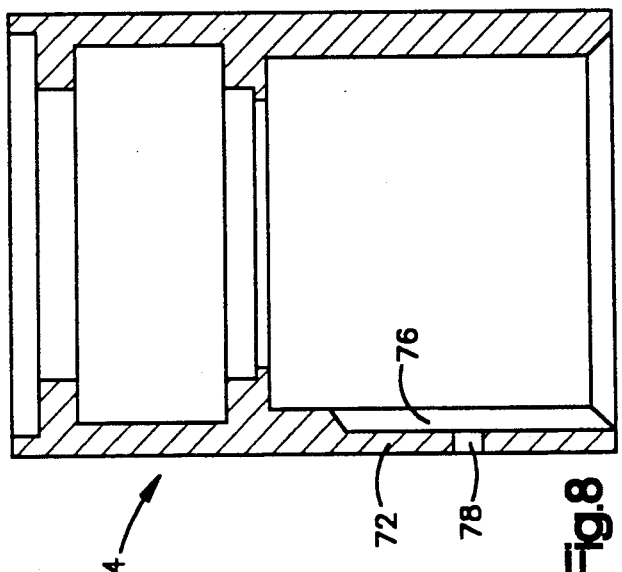
FIG. 8 is a cross-sectional view of an alternate housing usable as part of the present invention, with internal components removed for clarity of illustration.
Figure 9:
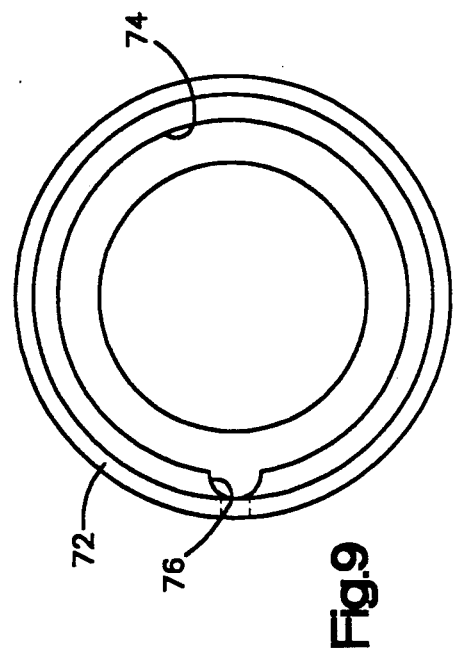
FIG. 9 is a bottom plan view of the housing of FIG. 8.

Referring to FIGS. 8 and 9, a modified form of the output housing 64 is shown. In the embodiment illustrated in FIGS. 8 and 9, the output housing 64 includes a modified hollow end portion 72. The end portion 72 includes a cylindrical inner wall 74 having a rounded, longitudinally extending slot 76 adapted to receive a cylindrical key (not shown). A threaded opening 78 extends through the sidewall of the end portion 72 in order to secure the key in place within the slot 76. The first end 36, when used with the end portion 72, includes a cylindrical end with a longitudinally extending cylindrical slot adapted to receive the cylindrical key.

Figure 4:
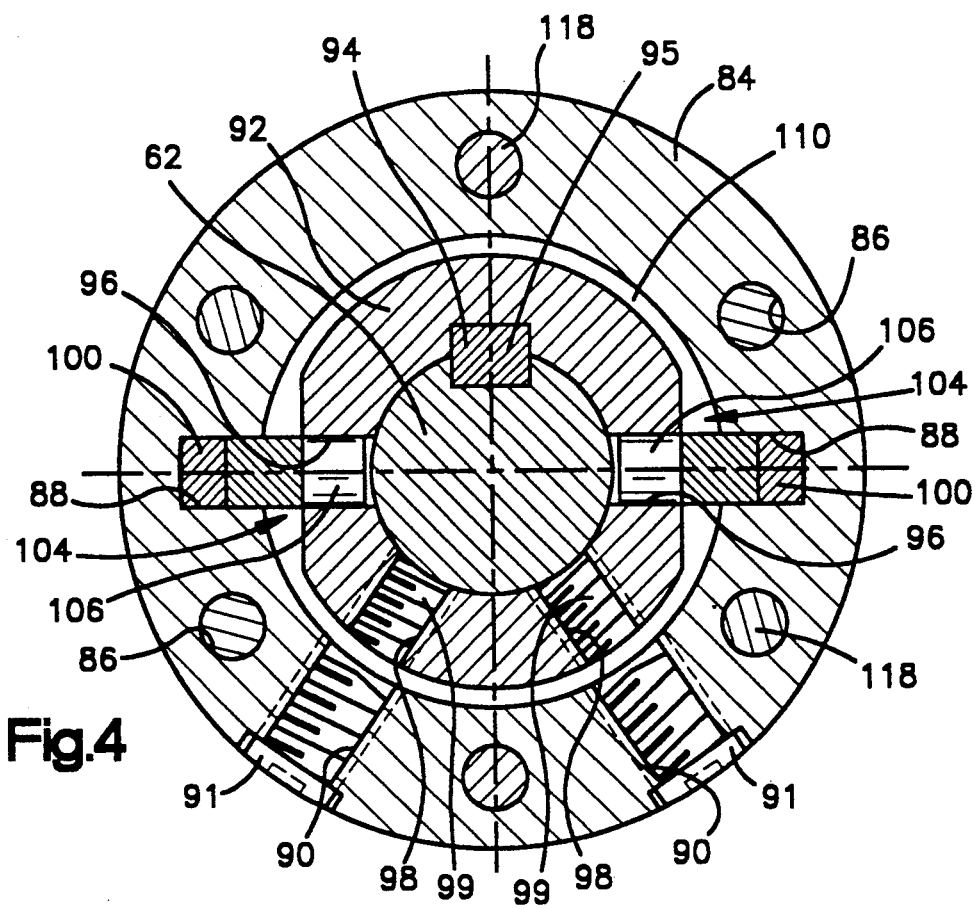
FIG. 4 is a cross-sectional view of a universal joint portion of the coupling taken along a plane indicated by line 4—4 in FIG. 2.

Referring now to FIGS. 2, 3 and 4, the first end 36 includes a threaded opening 80 having a longitudinal axis coincident with the axis 60. A threaded stud 82 is threaded into the opening 80 and is secured in place there by means of refractory cement. The opening 80 and the stud 82 are used with both configurations of the first end 36 disclosed herein.

The coupling 58 includes an input housing 84. The housing 84 forms a portion of a universal joint, as will be described. The housing 84 includes a plurality of longitudinally extending openings 86 disposed near its periphery. The housing 84 includes a pair of longitudinally extending slots 88 (FIG. 4) that are disposed on opposite sides of the housing 84. A pair of threaded openings 90 extend laterally through the sidewall of the housing 84. The openings 90 are spaced approximately 60 degrees apart. The openings 90 are adapted to receive threaded caps 91 that close the openings 90.

An input collar 92 is disposed concentrically within the housing 84. The collar 92 includes a longitudinally extending keyway 94. The keyway is adapted to receive a key 95 that mates with a slot formed in the drive shaft 62. The key 95 enables the drive shaft 62 and the collar 92 to be locked together for rotational movement. The collar 92 includes a pair of radially extending cylindrical openings 96 that are spaced 180 degrees apart. The collar 92 also includes a pair of radially extending threaded openings 98 that are spaced approximately 60 degrees apart. In use, the openings 98 are adapted to receive setscrews 99 that engage the side of the drive shaft 62 and thereby secure the collar 92 to the drive shaft 62 in a fixed axial position. The openings 90 are aligned with the openings 98 in order to provide access to the setscrews and to provide access to the interior of the housing 84, as will be described.

A pair of shoes 100 are disposed within the slots 88. The shoes 100 preferably are made of a semi-porous, durable material such as gray iron. The shoes 100 each include a concave surface 102 that faces toward the inner portion of the housing 84. A pair of so-called swivel keys 104 are connected to the collar 92. The swivel keys 104 preferably are made of a relatively soft bearing material such as SAE 660 bronze. A portion of each of the swivel keys 104 also is disposed within one of the slots 88. A cylindrical pin 106 projects from each of the keys 104 and is fitted within one of the openings 96. The swivel keys 104 also are provided with convex surfaces 108 that engage the concave surfaces 102 in substantial surface-to-surface contact. As will be apparent from the foregoing description, the swivel keys 104 can pivot about the pins 106, and they also can slide relative to the shoes 100 due to the interaction between the concave/convex surfaces 102, 108. The pins 106 and the concave/convex surfaces 102, 108 are at right angles to each other and therefore, permit the housing 84 to swivel relative to the drive shaft 62.

A disk-like plate 110 closes the lower portion of the housing 84. A disk-like plate 112 substantially closes the upper portion of the housing 84 except for a centrally located circular opening 113 through which the shaft 62 extends. The upper portion of the output housing 64 is indicated by the reference numeral 114. The portion 114 receives the plate 110 and the lower portion of the housing 84. A radially inwardly extending ledge 116 included as part of the upper portion 114 provides a surface against which the plate 110 can be secured. A plurality of bolts 118 are threaded into openings 119 formed in the upper portion 114. Upon tightening the bolts 118, the housing 84 and the plates 110, 112 will be tightly compressed in place against the upper portion 114.

Figure 5:
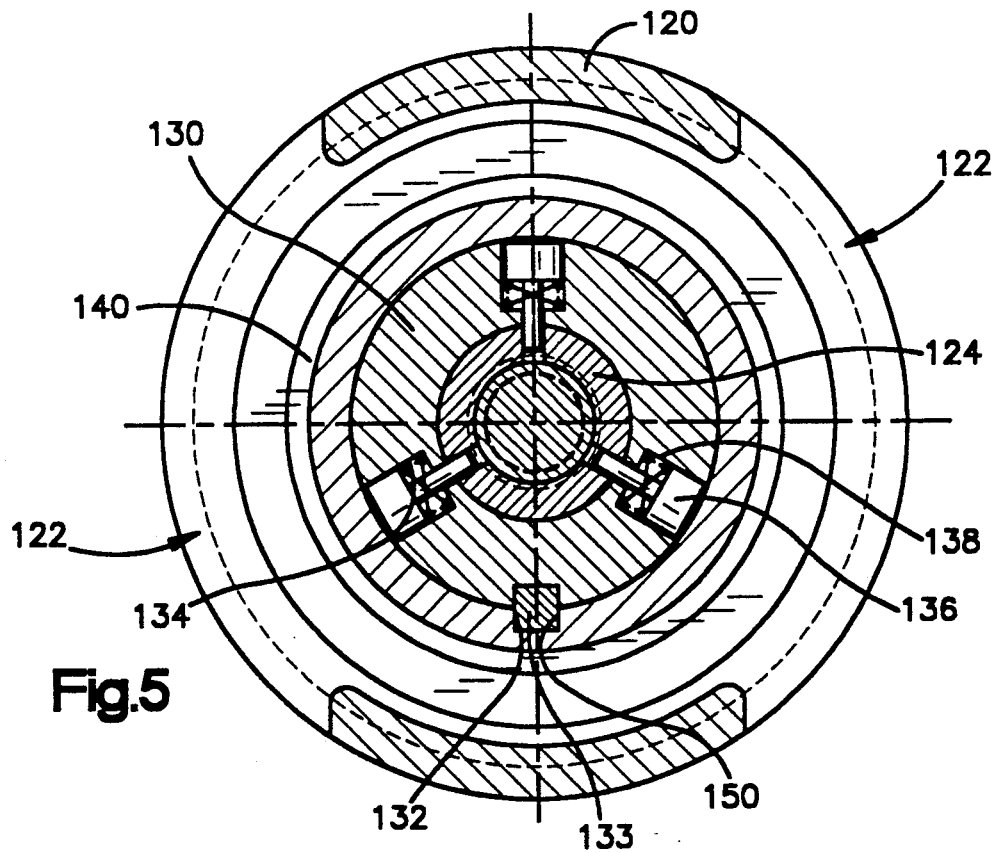
FIG. 5 is a cross-sectional view of a disconnect and axial adjustment portion of the coupling according to the invention taken along a plane indicated by line 5—5 in FIG. 2.

Referring particularly to FIGS. 2, 3, and 5, the housing 64 includes a pair of sidewall portions 120 that connect the hollow end 66 and the upper portion 114. A pair of cut-outs 122 are formed in the sidewalls 120 on opposite sides of the housing 64. A threaded nut 124 is disposed within the housing 64 and is threaded onto the end of the stud 82. The nut 124 includes a circumferential groove 126 near its upper end. A plurality of radially extending openings 128 extend through the nut 124 and open through the groove 126. A cylindrical sleeve 130 is disposed about the nut 124. A longitudinally extending slot 132 is formed on the outer surface of the sleeve 130. The slot 132 is adapted to receive a key 133. The sleeve 130 includes a plurality of radially extending openings 134 within which pins 136 are disposed. Springs 138 are disposed within the openings 134 in order to bias the pins 136 radially outwardly.

An annular, knurled knob 140 is disposed about the sleeve 130 and the pins 136. The knob 140 includes an outwardly flared, beveled inner surface 142 near its upper end. A washer 144 is disposed about the lower portion of the sleeve 130 in engagement therewith. The washer 144 rests atop a laterally extending ledge 146. The ledge 146 separates the hollow end portion 66 from the upper portion 114. A spring 148 is disposed about the sleeve 130 and in engagement with the knob 140 and the washer 144. The spring 148 serves to bias the knob 140 upwardly. The knob 140 includes a longitudinally extending slot 150 (FIG. 5) that receives the key 133. The key 1 33 provides a rotational driving connection between the sleeve 130 and the knob 140 while permitting relative axial movement therebetween.

Assembly and Operation

Assembly and operation are accomplished as follows:

1. Using either of the configurations for the first end 36 disclosed herein, the stud 82 is threaded into the opening 80 and is secured in place there by means of refractory cement.

2. Using either of the configurations for the second end 38 illustrated in FIGS. 10-12, the impeller 14 is secured to the shaft 18 by means of refractory cement.

3. The output housing 64 is oriented vertically and the washer 144 is positioned in place against the ledge 146 by sliding the washer 144 through one of the cut-outs 122.

4. The spring 148 is placed into engagement with the knob 140. The knob 140 and the spring 148 then are positioned within the upper portion 114 by sliding them through one of the cut-outs 122.

5. The springs 138 and the pins 136 are disposed within the openings 134 in the sleeve 130, and the assembled pins, springs, and sleeve are moved axially to that position shown in FIG. 2 by sliding them endwise through the upper end of the upper portion 114.

6. The plate 112 is positioned over the end of the drive shaft 62. The collar 92 is secured to the end of the drive shaft 62 by means of the setscrews 99 and the key 95. The pins 106 are fitted into the openings 96.

7. The shoes 100 are positioned such that the concave surfaces 102 engage the convex surfaces 108. The housing 84 is pushed over the shoes 100 and the swivel keys 104 by engaging the slots 88 with the shoes 100 and the swivel keys 104.

8. The plate 110 is positioned as shown in FIG. 2. The output housing 64 is positioned as shown in FIG. 2 such that the ledge 116 engages the plate 110.

9. The bolts 118 are fitted through the openings 86 and into engagement with the threaded openings 119 formed in the upper portion 114. The bolts 118 are tightened so that the assembly is locked together securely.

10. Lubricating fluid such as commonly available synthetic motor oil is injected into the housing 64 through one of the openings 90. The lubricating fluid fills the space between the inner surface of the housing 84 and the outer surface of the collar 92. The lubricating fluid is added until it reaches the level of the openings 90. The openings 90 are closed by means of the threaded caps 91.

11. The nut 124 is threaded partially onto the stud 82.

12. The knob 140 is pulled downwardly to that position shown in FIG. 3 so that the pins 136 are retracted.

13. The first end 36 is inserted into the hollow end portion 66 until the groove 126 is aligned with the pins 136.

14. The knob 140 is released so that the surface 142 applies radially inward force to the pins 136 under the influence of the spring 148. The knob 140 is rotated, thereby rotating the sleeve 130 and, with it, the pins 136. Eventually, the pins 136 are pressed into the openings 128.

15. After the pins 136 engage the openings 128, continued rotation of the knob 140 causes the nut 124 to be rotated. In turn, the stud 82 will be moved axially relative to the end portion 66. Rotation of the knob 140 is continued until a desired axial location of the shaft 18 is attained.

16. Upon activation of the motor 20, the drive shaft 62 will be rotated. Because the drive shaft 62 is connected to the upper end 36 by way of the collar 92, shoes 100, keys 104, housing 84, bolts 118, and end portion 66, the shaft 18 also will be rotated. No relative rotational movement will occur between the stud 82 and the nut 124. Any slight misalignment between the shaft 18 and the drive shaft 62 will be accommodated by the swiveling action permitted by the shoes 100 and the swivel keys 104.

17. When it is desired to remove the shaft 18 for purposes of repair or replacement, the knob 140 is pulled downwardly to that position shown in FIG. 3. In this position of the knob 140, the beveled surface 142 permits the pins 136 to be moved radially outwardly under the influence of the springs 138. The pins 136 will be disengaged from the groove 126 and the openings 128. At that point, the nut 124 will be permitted to move axially relative to the sleeve 130, thereby permitting the shaft 18 to be removed from the coupling 58.

18. When it is desired to reposition the shaft 18, the knob 140 again is pulled downwardly to that position shown in FIG. 3. Upon moving the nut 124 upwardly into the housing 64, eventually the groove 126 will be positioned adjacent the pins 136. Upon releasing the knob 140 and rotating the knob 140, the pins 136 will re-engage the openings 128, thereby re-establishing a driving connection between the knob 140 and the nut 124. Continued rotation of the knob 140 will cause the stud 82 to be moved axially relative to the nut 124, as described previously.

As will be apparent from the foregoing description, damage to the impeller shaft 18 will be eliminated, or substantially reduced, in part because it is easy to machine the ends of the shaft 18, and in part because the strength of the shaft 18 and the existence of the universal joint will prevent catastrophic failure of the shaft 18. Because the housing 84 is fluid-tight (except for the opening 113), the shoes 100 and the swivel keys 104 will be lubricated at all times, thereby ensuring reliability of the universal joint. The lubrication of the shoes 100 and the swivel keys 104 is enhanced due to the "wicking" action created by the semi-porous gray iron shoes 100. Because the universal joint according to the invention will be operated in a high-temperature environment, the lubrication of the shoes 100 and the swivel keys 104 will extend the life of the universal joint compared with conventional universal joints.

The particular configuration of the impeller 14 and the shaft 18 insures that the impeller 14 and the shaft 18 can be connected easily and quickly, and the resultant connection is very strong. The construction of the coupling 58, and in particular the nut 124, sleeve 130 and related components, enables the shaft 18 to be connected and disconnected from the drive motor 20 quickly, and to be easily adjusted axially relative to the drive motor 20. If it should be necessary to replace worn or broken parts of the coupling 58, such repair or replacement can be accomplished without difficulty, simply by disconnecting the shaft 18 from the hollow end 66 and thereafter removing the bolts 118. No special tools or equipment are needed to remove or replace any of the components used with the invention.

AN ALTERNATIVE EMBODIMENT

The invention as described previously provides, among other features, a universal joint, quick disconnect, and easy axial adjustment capabilities for the shaft-motor coupling. It is possible that some of the features of the invention could be used, while others would not. One possible modification of the invention would be the elimination of the quick disconnect feature.

In order to eliminate the quick disconnect feature while preserving the capability of easily adjusting the axial position of the shaft 18, the nut 124, sleeve 130, pins 136, springs 138, knob 140, washer 144, and spring 148 are removed. In their place, a thick washer (approximately 0.563 inch) is placed atop the ledge 146 in place of the relatively thin washer 144. Another knob (not shown) similar to the knob 140 is placed atop a thick washer that has been substituted for the washer 144. The replacement knob includes a longitudinally extending threaded opening that is adapted to receive the threaded stud 82. Accordingly, upon placing the first end 36 into the hollow end portion 66, the substitute nut can be rotated so as to draw the stud 82 into the upper portion 114. Because the weight of the shaft 118 will pull the substitute knob downwardly against the substitute washer, the knob will remain in the rotational position selected by the user while pumping operations are being conducted. If it should be desired to change the axial position of the shaft 18, or even remove it completely from the coupling 58, it is only necessary that the rotation of the drive shaft 62 be stopped and the substitute knob rotated until the stud 82 is disengaged from the knob. Thereafter, the shaft 18 can be removed from the end portion 66. While the alternative embodiment is not as desirable as the first-described embodiment (because it will take longer to disconnect the presumably heated components), nevertheless the alternative embodiment offers a modest cost savings to the user.

Although the invention as been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A coupling for connecting a shaft to a drive motor, comprising:
    means for connecting the coupling to the drive motor;
    means for quickly disconnecting the shaft from the coupling; and
    a universal joint that permits the coupling to swivel relative to the shaft, the universal joint including:
        a first member rigidly connected to the shaft;
        a second member concentrically disposed about the first member;
        a pair of keys connected to a selected one of the first or second members on opposite sides thereof, the keys having a rounded outer surface and a cylindrical projecting portion engagable with the selected member, the outer surface and the projecting portion being disposed at right angles to each other; and
        a pair of shoes connected to the other of the selected members on opposite sides thereof, the shoes including a rounded portion engagable with the rounded portion of the keys for sliding movement relative thereto.

2. The coupling of claim 1, wherein the second member during use is fluid-tight, and lubricating fluid is contained within the second member.

3. The coupling of claim 1, wherein the keys are carried by the first member, and the shoes are carried by the second member.

4. The coupling of claim 1, wherein the coupling includes means for adjusting the axial position of the shaft relative to the coupling.

5. The coupling of claim 4, wherein the means for adjusting the axial position of the shaft includes:
    a threaded stud projecting form the first end of the shaft, the stud having a longitudinal axis disposed generally parallel to the longitudinal axis of the shaft; and
    a nut threaded onto the end of the stud, the nut being carried by the coupling.

6. An impeller shaft assembly, comprising:
    an elongate shaft having first and second ends, the first end connected to a coupling which in turn is connected to a drive motor and the second end adapted to be connected to an impeller;
    the first end of the shaft being non-cylindrical in cross-section and including a plurality of rounded side portions having a relatively large radius and rounded corners connecting the side portions, the corners having a relatively small radius;
    means for connecting the coupling to the drive motor; and means for quickly disconnecting the shaft from the coupling, the means for quickly disconnecting the shaft from the coupling including:
- a first portion connected to the motor for rotation therewith;
- a second portion connected to the shaft for rotation therewith, the first and second portions being disposed concentrically with respect to each other;
- a pinned connection between the first and second portions, the pinned connection being movable between shaft-holding and shaft-releasing positions; and
- means for releasing the pinned connection in order to permit th first and second potions to be axially displaced relative to each other, the means for releasing the pinned connection including an annular knob disposed intermediate the first and second portions, the annular knob being in contact with the pinned connection and movable relative thereto in order to permit the pinned connection to be moved to the shaft-releasing position.

7. The assembly of claim 6, wherein the second portion includes a threaded stud projecting from the end of the shaft, and the pinned connection includes a threaded nut threaded onto the stud, a sleeve surrounding the nut, and radially movable pins carried by the sleeve, the annular knob being disposed about the sleeve in contact with the pins.

8. An impeller shaft assembly, comprising:
- an elongate shaft having first and second ends, the first end connected to a coupling which in turn is connected to a drive motor and the second end adapted to be connected to an impeller; and
- the first end of the shaft being non-cylindrical in cross-section and including a plurality of rounded side portions having a relatively large radius and rounded corners connecting the side portions, the corners having a relatively small radius;
- a drive shaft extending from the drive motor; and
- a universal joint included as part of the coupling that permits the coupling to swivel relative to the drive shaft, the universal joint including:
  - a first member rigidly connected to the drive shaft;
  - a second member concentrically disposed about the first member;
  - a pair of keys connected to a selected one of the first or second members on opposite sides thereof, the keys having a rounded outer surface and a cylindrical projecting portion engagable with the selected member, the outer surface and the projecting portion being disposed at right angles to each other; and
  - a pair of shoes connected to the other of the selected members on opposite sides thereof, the shoes including a rounded portion engagable with the rounded portion of the keys for sliding movement relative thereto.

9. The assembly of claim 8, wherein the second member during use is fluid-tight, and lubricating fluid is contained within the second member.

10. The assembly of claim 8, wehrein the keys are carried by the first member, and the shoes are carried by the second member.

11. An impeller shaft assembly, comprising:
- an elongate shaft having first and second ends, the first end connected to a coupling which in turn is connected to a drive motor and the second end adapted to be connected to an impeller;
- the first end of the shaft being non-cylindrical in cross-section and including a plurality of rounded side portions having a relatively large radius and rounded corners connecting the side portions, the corners having a relatively small radius;
- means for connecting the coupling to the drive motor; and
- means for adjusting the axial position of the shaft relative to the coupling, including the means for adjusting the axial position of the shaft including;
  - a threaded stud projecting from the first end of the shaft, the stud having a longitudinal axis disposed generally parallel to the longitudinal axis of the shaft; and
  - a nut threaded onto the end of the stud, the nut being carried by the coupling.

12. A coupling for connecting a shaft to a drive motor, comprising:
- means for connecting the coupling to the drive motor; and
- means for quickly disconnecting the shaft from the coupling, the means for quickly disconnecting the shaft from the coupling including:
  - a first portion connected to the motor for rotation therewith;
  - a second portion connected to the shaft for rotation therewith, the first and second portions being disposed concentrically with respect to each other;
  - a pinned connection between the first and second portions, the pinned connection being movable between shaft-holding and shaft-releasing positions; and
  - means for releasing the pinned connection in order to permit the first and second portions to be axially displaced relative to each other, the means for releasing the pinned connection including an annular knob disposed intermediate the first and second portions, the annular knob being in contact with the pinned connection and movable relative thereto in order to permit the pinned connection to be moved to the shaft-releasing position.

13. The coupling of claim 12, wherein the second portion includes a threaded stud projecting form the end of the shaft, and the pinned connection includes a threaded nut threaded onto the stud, a sleeve surrounding the nut, and radially movable pins carried by the sleeve, the annular knob being disposed about the sleeve in contact with the pins.

14. The coupling of claim 12, wherein the coupling includes a universal joint that permits the coupling to swivel relative to the shaft.

* * * * *